United States Patent [19]

Sano et al.

[11] Patent Number: 4,786,687

[45] Date of Patent: Nov. 22, 1988

[54] MOLDING COMPOSITION

[75] Inventors: Akira Sano, Kawasaki; Masataka Oka, Fujisawa; Tetsujirou Kuroishi, Chiba; Kazuo Matsuura, Tokyo, all of Japan

[73] Assignee: Nippon Oil Co., Ltd., Tokyo, Japan

[21] Appl. No.: 854,327

[22] Filed: Apr. 21, 1986

[30] Foreign Application Priority Data

May 30, 1985 [JP] Japan ................................ 60-116979

[51] Int. Cl.$^4$ .................. C08L 23/04; C08L 23/06
[52] U.S. Cl. .................................. 525/240; 525/268; 525/324; 526/125; 526/123; 526/903
[58] Field of Search .......................................... 525/240

[56] References Cited

U.S. PATENT DOCUMENTS

| | | | |
|---|---|---|---|
| 3,969,470 | 7/1976 | Spiegelman | 525/240 |
| 4,311,752 | 1/1982 | Diedrich et al. | 428/220 |
| 4,336,352 | 6/1982 | Sakurai et al. | 525/240 |
| 4,461,873 | 7/1984 | Bailey et al. | 525/240 |

FOREIGN PATENT DOCUMENTS

| | | | |
|---|---|---|---|
| 57-177036 | 10/1982 | Japan | 525/240 |
| 59-126466 | 7/1984 | Japan | 525/227 |

Primary Examiner—Carman J. Seccuro
Attorney, Agent, or Firm—Bucknam and Archer

[57] ABSTRACT

A molding composition is disclosed which comprises ultrahigh molecular weight polyethylene having an intrinsic viscosity of 10–30 dl/g at 135° C. in decalin. Improved injection moldability is provided by the use of such polyethylene obtainable by a multi-stage polymerization reaction including at least the following two stages: (a) a first stage in which ethylene is polymerized using a specified composite catalyst in the absence of hydrogen of its presence at lower concentration to produce 50–99.5 weight parts of polyethylene having an intrinsic viscosity of 12–32 dl/g at 135° C. in decalin; and (b) a second stage in which a fresh feed of ethylene is polymerized in the presence of hydrogen at higher concentration to produce 50–0.5 weight parts of polyethylene having an intrinsic viscosity of 0.1–5 dl/g at 135° C. in decalin.

2 Claims, No Drawings

MOLDING COMPOSITION

BACKGROUND OF THE INVENTION

1. Field of the Invention

This invention relates to molding compositions for ethylene polymers and more particularly to such a molding composition comprising ultrahigh molecular weight polyethylene obtainable by employing a selected mode of multi-stage polymerization reaction and a catalyst of a selected composition therefor.

2. Description of the Prior Art

An ethylene polymer with an extremely high molecular weight of about one million or greater is generally known as ultrahigh molecular weight polyethylene (hereinafter referred to simply as "UHMW polyethylene"). UHMW polyethylene is known in common use as an engineering plastic material characterized by high impact and wear resistance and self-lubrication, and hence it has found extensive application to hoppers, silos, gears, linings and the like for use in the various fields of industry including food processing, civil engineering, chemistry, agriculture and mining, and further to backings for skis, and sports and leisure supplies.

Because of its high molecular weight, UHMW polyethylene is literally too viscous for molding in hot melt and even in solution; that is, it is only marginally moldable. This presents a bottleneck in the efforts to open up new areas of market for UHMW polyethylene in spite of the aforesaid excellent properties.

In order to cope with this problem, there have been proposed certain improved modes of UHMW polyethylene molding, typical examples of which are an injection molding method as disclosed in Japanese Patent Application (Kokai) No. 57-82031 and an injection-compression molding method as disclosed in Japanese Patent Application (Kokai) No. 57-169335. Such known molding methods however involve preforming UHMW polyethylene in a particulate form into pellets or similar shapes.

Alternatively, polyolefin waxes and petroleum resins have been used as additives to improve the moldability of UHMW polyethylene, but their compatibility was not satisfactory, resulting in molded articles of reduced mechanical strength and low impact resistance.

SUMMARY OF THE INVENTION

It is the primary object of the present invention to provide a molding composition comprising UHMW polyethylene which is uniform as regards its polymer particle distribution and which in particular exhibits enhanced injection molding performance, giving molded articles of excellent quality.

This and other objects and advantages of the invention can be achieved by the provision of a molding composition comprising an ultrahigh molecular weight polyethylene material having an intrinsic viscosity of 10–30 dl/g at 135° C. in decalin, said material resulting from at least the following two stages of polymerization reaction:

(a) a first reaction stage in which an ethylene momomer is polymerized with use of a composite catalyst comprising a solid component containing at least magnesium, titanium and/or vanadium and an organometallic compound and in the absence of hydrogen or in the presence of hydrogen at a lower concentration to produce 50–99.5 parts by weight of polyethylene having an intrinsic viscosity of 12–32 dl/g at 135° C. in decalin; and (b) a second reaction stage in which a fresh feed of ethylene monomer is polymerized in the presence of hydrogen at a higher concentration to produce 50–0.5 parts by weight of polyethylene having an intrinsic viscosity of 0.1–5 dl/g at 135° C. in decalin.

The UHMW polyethylene of the invention has the following characteristic features:

(1) High homogeneity and reduced quality change.
(2) Enhanced injection moldability.

DETAILED DESCRIPTION OF THE INVENTION

UHMW polyethylene useful for the purpose of the present invention can be produced by a multi-stage polymerization reaction including at least the following two stages.

The first reaction stage involves forming an ethylene homopolymer in an amount of 50–99.5 parts by weight, preferably 75–99 parts by weight. This homopolymer has an intrinsic viscosity $[\eta]$ of 12–32 dl/g as measured at 135° C. in decalin. The reaction may be effected by polymerizing an ethylene monomer in a solvent or in a gas phase and in the presence of hydrogen of 0–about 10 mol percent and with use of a catalyst later described. Reaction pressures may be in the range of 0–70 kg/cm$^2$·G, and reaction temperatures may be in the range of 0°–90° C., preferably 20°–80° C. Eligible solvents are at large those inert to Ziegler catalysts add include for example saturated hydrocarbons such as butane, pentane, hexane, heptane, octane and cyclohexane, and aromatic hydrocarbons such as benzene, toluene and xylene.

The second reaction stage involves forming an ethylene homopolymer or copolymer in an amount of 50–0.5 parts by weight, preferably 25–1 parts by weight. This homopolymer or copolymer has an intrinsic viscosity of 0.1–5 dl/g at 135° C. in decalin. The reaction may be effected by polymerizing a fresh feed of ethylene monomer or by copolymerizing the latter with an α-olefin monomer in the presence of hydrogen of 35–95 mol percent. Reaction pressures may be in the range of 0–70 kg/cm$^2$·G, and reaction temperatures may be in the range of 40° C.–100° C., preferably 60°–90° C. The catalyst may be replenished if necessary. α-Olefins eligible for copolymerization in the second stage are monomers copolymerizable with ethylene in the presence of Ziegler catalysts and include for example propylene, butene-1, 4-methylpentene-1, hexene-1 and octene-1. These monomers should be added in small amounts of about 0.1–5 mol percent, and larger amounts should be avoided to preclude a decline in the molecular weight of the resulting copolymer.

In addition to the foregoing two stages, there may be employed an extra stage or stages in which polymer components of higher or lower molecular weights are added to provide a wider range of polyethylene products.

It is known that the wider the molecular weight distribution of a resin, the better is its injection moldability. To this end, there are used multi-stage polymerization methods, and blended resins of varying molecular weights.

It has now been found that UHMW polyethylene of the desired properties according to the invention can be obtained by strict observance of the specific sequence of reaction in which polyethylene of a higher molecular weight is initially formed, followed by the formation of additional polyethylene of a lower molecular weight. Reversal of this sequence, given sufficient molecular weight distribution, fails to provide UHMW polyethylene contemplated by the invention.

While exact reasoning for the peculiar moldability characteristics of the UHMW polyethylene of the invention is not known, it is believed that the particulate polymer has a multiplex structure consisting of an inner phase predominantly of a lower molecular weight polymer which presumably acts as a plasticizer under melt molding conditions (usually at 180°–280° C.) and thus contributes to improved moldability.

The catalyst to be used in the invention essentially comprises an inorganic solid component and an organometallic compound, the solid component including at least magnesium, titanium and/or vanadium. Typical of such solid catalyst component is a titanium compound carried in a known manner on a magnesium-containing solid compound.

Eligible inorganic magnesium-containing compounds include for example magnesium, magnesium hydroxide, magnesium carbonate, magnesium oxide, magnesium chloride and the like, double salts, mixed oxides, carbonates, chlorides and hydroxides each containing both a metal selected from silicon, aluminum and calcium and a magnesium atom, and those compounds derived by treating the inorganic compounds with water, organic oxygen-containing compounds such as alcohols, phenols, ketones, aldehydes, carboxylic acids and their esters, polysiloxanes and their acid amides and the like, inorganic oxygen-containing compounds such as alkoxides and oxyacid salts of metals and the like, organic sulfur-containing compounds such as thiols, thioethers and the like, inorganic sulfur-containing compounds such as sulfur dioxide, sulfur trioxide, sulfur and the like, monocyclic or polycyclic aromatic hydrocarbons such as benzene, toluene, xylene, anthrathene, phenanthrene and the like, or halogen-containing compounds such as chlorine, hydrogen chloride, chlorides of metals, organic halides and the like.

Eligible titanium compounds to be carried on the above inorganic magnesium-containing solid compounds include for example halides, alkoxy halides, alkoxides and halogen oxides of titanium and the like. Preferred among these are tetravalent and trivalent titanium compounds.

Tetravalent titanium compounds are those having the formula

where R is an alkyl group of 1 to 20 carbon atoms or an aryl or aralkyl group, X is a halogen atom and n is $0 \leq n \leq 4$.

Specific examples include titanium tetrachloride, titanium tetrabromide, titanium tetraiodide, monomethoxytrichlorotitanium, dimethoxydichlorotitanium, trimethoxymonochlorotitanium, tetramethoxytitanium, monoethoxytrichlorotitanium, diethoxydichlorotitanium, triethoxymonochlorotitanium, tetraethoxytitanium, monoisopropoxytrichlorotitanium, diisopropoxydichlorotitanium, triisopropoxymonochlorotitanium, tetraisopropoxytitanium, monobutoxytrichlorotitanium, dibutoxydichlorotitanium, monopentoxytrichlorotitanium, monophenoxytrichlorotitanium, diphenoxydichlorotitanium, triphenoxymonochlorotitanium, tetraphenoxytitanium and the like.

Trivalent titanium compounds are those derived by reducing titanium tetrahalides such as titanium tetrachloride and titanium tetrabromide with hydrogen, aluminum, titanium or organometallic compounds of metals of Groups I to III of the Periodic Table, or by reducing tetravalent alkoxytitanium halides of the formula

where R is an alkyl group of 1 to 20 carbon atoms or an aryl or aralkyl group, X is a halogen atom and m is $0 < m < 4$, with organometallic compounds of metals of Groups I to III.

Tetravalent titanium compounds are particularly preferred.

Vanadium compounds also eligible as the solid catalyst component include for example tetravalent vanadium compounds such as vanadium tetrachloride, pentavalent vanadium compounds such as vanadium oxytrichloride and o-alkyl vanadate and trivalent vanadium compounds such as vanadium trichloride.

Further details of the solid catalyst components are disclosed for example in Japanese Patent Publication Nos. 51-3514, 50-23864, 51-152, 52-15111, 52-11710 and 51-153 and Japanese Patent Application (Kokai) Nos. 49-106581 and 56-95909. Modified forms of solid catalyst components may be used in the invention. One such form involves using a reaction product of Grignard compounds with titanium compounds as disclosed for example in Japanese Patent Publication Nos. 50-39470, 54-12953 and 54-12954 and Japanese Patent Application (Kokai) No. 57-79009. Another example uses an inorganic oxide together with an organic carboxylic acid ester, which ester is disclosed to be an arbitrary additive in Japanese Patent Application (Kokai(bK:) Nos. 56-47407, 57-187305 and 58-21405.

Organoaluminum compounds according to the invention are represented by the formulae

where R is an alkyl group of 1 to 20 carbon atoms or an aryl or aralkyl group, R being the same or different, and X is a halogen atom.

Specific examples include triethylaluminum, triisobutylaluminum, trihexylaluminum, trioctylaluminum, diethylaluminum chloride, diethylaluminum ethoxide, ethylaluminum sesquichloride and mixtures thereof. There is no particular restriction imposed on the amount of the organoaluminum compounds to be added which however is usually in the range of 0.1–1,000 times per mole of titanium compound.

It has now been found that polymerization activity can be greatly enhanced by contacting an α-olefin preferably of the above-mentioned type with the catalyst system prior to initiation of the polymerization reaction and that this pretreatment leads to a more stable polymerization reaction.

No particular restriction is imposed on the time length and temperature of contact between the catalyst and the α-olefin. However, it is usually convenient to pre-catalyze the olefin in an amount of 1-50,000 g, preferably 5-30,000 g, per gram of catalyst at 0°-200° C., preferably 0°-110° C., and for one minute-24 hours.

The following examples are given to further illustrate the present invention. In these examples, the intrinsic viscosities are those measured at 135° C. in decalin and all parts are by weight unless otherwise specified.

Invention Example 1

(a) Preparation of Solid Catalyst Component

Into a 400-ml stainless steel pot having therein 25 stainless steel balls, each 0.5 inch in diameter, were placed 10 g of commercially available anhydrous magnesium chloride, 3.3 g of silicon tetraethoxide and 0.7 g of phosphorus oxychloride. Ball milling was effected in a nitrogen atmosphere at room temperature fo 5 hours, followed by addition of 2 g of titanium tetrachloride. Ball milling was continued for a further 16 hours. There was 32 mg titanium per gram of the resulting solid catalyst component.

(b) Polymerization

A 2-liter stainless steel autoclave equipped with an induction stirrer was purged with nitrogen and charged with 1,000 ml of hexane, 1 mmol of triethylaluminum and 10 mg of the solid catalyst component prepared as above. The mixture was heated with stirring to 60° C. and the pressure in the system raised to 1.5 kg/cm$^2$·G with hexane vapor pressure. Ethylene was then charged to a total pressure of 0 kg/cm$^2$·G. Polymerization was initiated, and ethylene was successively fed from a 5-liter ethylene metering tank to maintain the system at 10 kg/cm$^2$·G. Polymerization was continued until the pressure in the ethylene tank dropped to 8 kg/cm$^2$ (1st reaction stage). The resulting polymer showed an intrinsic viscosity of 18.9 dl /g.

Unreacted ethylene in the system was quickly purged, followed by charge of hydrogen to a total pressure of 7 kg/cm$^2$·G and then a fresh feed of ethylene to a total pressure of 10 kg/cm$^2$·G. Polymerization was resumed at 60° C. Ethylene feed was continued until the system reached a total pressure of 10 kg/cm$^2$·G. Polymerization was continued until the pressure in the ethylene tank dropped to 2 kg/cm$^2$ (2nd reaction stage).

The resulting polymer slurry was put into a beaker, and hexane was then removed in vacuum to give 62 g of white polyethylene. The amount of polymer was 80 parts in the first stage and 20 parts in the second stage. The composite polymer showed an intrinsic viscosity of 12.9 dl/g.

(c) Evaluation of Moldability

The polymer obtained in this Invention Example was injection-molded with an injection machine (2S-90B, Toshiba Machine Co.). Molding was possible under conditions of melt temperature: 270° C., injection pressure: 1,200 kg/cm$^2$ and mold temperature: 50° C.

The physical properties of the resulting molded piece were measured with results given in the Table below.

Measurement of these properties was conducted by the following methods.
Tensile strength (yield point): ASTM D638
Elongation at break in tension: ASTM D638
Izod impact strength (V-notched): ASTM D256
Taber abrasion (CS-10): JIS K7204

COMPARISON EXAMPLE 1

A 2-liter stainless steel autoclave equipped with an induction stirrer was nitrogen-purged and charged with 1,000 ml of hexane, 1 mmol of triethylaluminum and 10 mg of the solid catalyst component prepared as in Invention Example 1(a). The mixture was heated with stirring to 70° C. and the pressure in the system raised to 1.6 kg/cm$^2$·G with hexane vapor pressure. Ethylene was then charged to a total pressure of 10 kg/cm$^2$·G. Polymerization was initiated, and ethylene charge was continued until the system reached a total pressure of 10 kg/cm$^2$·G. Polymerization was continued for 20 minutes to thereby obtain 72 g of white polyethylene whose intrinsic viscosity was 14.2 dl/g.

Injection moldability of the resulting polymer was examined under the conditions of Invention Example 1(c) with the results that surging took place in the molded piece.

COMPARISON EXAMPLE 2

The procedure of Comparison Example 1 was followed except that polymerization was effected at 65° C., thereby giving 60 g of white polyethylene whose intrinsic viscosity was 15.0 dl/g. The polymer was tested for injection moldability under the conditions of Invention Example 1(c) when surging occurred in the molded piece.

COMPARISON EXAMPLE 3

Eighty (80) parts of polyethylene obtained in a manner similar to Comparison Example 1 was blended with 20 parts of a polyethylene wax (5,000 in molecular weight, Sanyo Chemical Industries Ltd.), followed by pelletization with a plastograph. Injection moldability of the resulting pellets was tested under the conditions of Invention Example 1(c). Surging occurred in the molded piece.

COMPARISON EXAMPLE 4

Sixty (60) parts of polyethylene obtained in a manner similar to Comparison Example 1 was blended with 40 parts of a polyethylene wax (5,000 in molecular weight, Sanyo Chemical Industries Ltd.). The blend was pelletized with a plastograph. The resulting pellets were tested for injection moldability under the conditions of Invention Example 1(c). Molding was possible, but the molded piece showed extremely reduced tensile strength and low abrasion resistance as shown in the Table, meaning that the polymer failed to exhibit its characteristics as being of an ultrahigh molecular weight.

INVENTION EXAMPLE 2

The procedure of Invention Example 1(b) was followed except that the pressure drop in the ethylene tank was 9.0 kg/cm$^2$ in the first reaction stage and 1.0 kg/cm$^2$ in the second reaction stage, thereby giving 63 g of white polyethylene. The amount of polymer was 90 parts in the first stage and 10 parts in the second stage. The composite polymer had an intrinsic viscosity of 14.9 dl/g.

An injection moldabiity test was conducted under the conditions of Invention Example 1(c). Molding was possible with physical properties tabulated.

INVENTION EXAMPLE 3

The procedure of Invention Example 1(b) was followed except that the pressure drop in the ethylene tank was 8.5 kg/cm² in the first reaction stage and 1.5 kg/cm² in the second reaction stage, thereby giving 62 g of white polyethylene. The amount of polymer was 85 parts in the first stage and 15 parts in the second stage. The composite polymer had an intrinsic viscosity of 13.0 dl/g.

The polymer was tested for injection moldability under the conditions of Invention Example 1(c). Molding was possible with results tabulated.

INVENTION EXAMPLE 4

(a) Preparation of Solid Catalyst Component

The procedure of Invention Example 1(a) was followed except that 1.9 g of boron triethoxide was used in place of 3.3 g of silicon tetraethoxide. There was 35 mg of titanium per gram of the resulting catalyst component.

(b) Polymerization

An autoclave similar to that employed in Invention Example 1(b) was charged with 1,000 ml of hexane, 2 mmol of diethylaluminum chloride and 10 mg of the solid catalyst component prepared as in this Invention Example. The mixture was heated with stirring to 40° C. and the pressure in the system raised to 1.3 kg/cm²·G with hexane vapor pressure. Ethylene was then charged to a total pressure of 10 kg/cm²·G. Polymerization was initiated, and ethylene feed was continued from a 5-liter ethylene metering tank to maintain the system at 10 kg/cm²·G. Polymerization was continued until the pressure in the ethylene tank dropped to 8 kg/cm² (1st reaction stage). The resulting polymer had an intrinsic viscosity of 26.1 dl/g.

The autoclave was purged of unreacted ethylene, and its temperature was elevated to 80° C. Hydrogen was charged to 8 kg/cm²·G and then ethylene to a total pressure of 10 kg/cm²·G. Polymerization was resumed with a fresh feed of ethylene chargd to a total pressure of 10 kg/cm²·G. Polymerization was continued until the pressure in the ethylene tank dropped to 2 kg/cm² (2nd reaction stage). The polymer slurry was taken into a beaker, and hexane was then removed in vacuum to give 62 g of white polyethylene. The amount of polymer was 80 parts in the first stage and 20 parts in the second stage. The composite polymer showed an intrinsic viscosity of 14.5 dl/g.

The polymer was tested for injection moldability under the conditions of Invention Example 1c. Molding was possible with results tabulated.

INVENTION EXAMPLE 5

The procedure of Invention Example 4b was followed except that the pressure drop in the ethylene tank was 8.5 kg/cm² in the first reaction stage and 1.5 kg/cm² in the second reaction stage, thereby giving 63 g of white polyethylene. The amount of polymer was 85 parts in the first stage and 15 parts in the second stage. The composite polymer had an intrinsic viscosity of 15.2 dl/g.

The polymer was tested for injection moldability under the conditions of Invention Example 1c. Molding was possible with results tabulated.

INVENTION EXAMPLE 6

(a) Preparation of Solid Catalyst Component

The procedure of Invention Example 1a was followed except that 2.0 g of titanium tetrachloride was used in combination with 0.5 g of triethoxy vanadium oxide (VO(OC$_2$H$_5$)$_3$). There were 7.6 mg of vanadium and 30.6 mg of titanium per gram of the resulting solid catalyst component.

(b) Polymerization

An autoclave similar to Invention Example 1(b) was charged with 1,000 m of hexane, 1 mmol of triethylaluminum and 10 mg of the solid catalyst component prepared as in this Invention Example. The mixture was heated with stirring to 60° C. and the pressure in the system raised to 1.5 kg/cm²·G with hexane vapor pressure. Ethylene was then charged to a total pressure of 10 kg/cm²·G. Polymerization was initiated, and ethylene feed was continued from a 5-liter ethylene metering tank to maintain the system at 10 kg/cm²·G. Polymerization was continued until the pressure in the ethylene tank dropped to 8 kg/cm² (1st reaction stage). The resulting polymer had an intrinsic viscosity of 20.5 dl/g.

The autoclave was quickly purged of unreacted ethylene, and hydrogen was charged to 7 kg/cm²·G and then ethylene to a total pressure of 10 kg/cm²·G. Polymerization was resumed with a fresh feed of ethylene charged to a total pressure of 10 kg/cm²·G. Polymerization was continued until the pressure in the ethylene tank dropped to 2 kg/cm² (2nd reaction stage).

The resulting polymer slurry was taken into a beaker, and hexane was then removed in vacuum to give 60 g of white polyethylene. The amount of polymer was 80 parts in the first stage and 20 parts in the second stage. The composite polymer showed an intrinsic viscosity of 13.8 dl/g.

The polymer was tested for injection moldability under the conditions of Invention Example 1(c). Molding was possible with results tabulated.

TABLE

| Example | 1st stage polymer (weight part) | 2nd stage polymer (weight part) | Intrinsic viscosity (dl/g) | Tensile strength (kg/cm²) | Elongation at break in tension (%) | Izod impact strength (kg-cm/cm) | Abrasion wear (mg) |
|---|---|---|---|---|---|---|---|
| Invention Example 1 | 80 | 20 | 12.9 | 222 | 49 | Not broken | 1.9 |
| Invention Example 2 | 90 | 10 | 14.9 | 208 | 43 | " | 1.3 |
| Invention Example 3 | 85 | 15 | 13.0 | 218 | 48 | " | 1.8 |
| Invention Example 4 | 80 | 20 | 14.5 | 215 | 45 | " | 1.4 |
| Invention Example 5 | 85 | 15 | 15.2 | 204 | 41 | " | 1.2 |
| Invention | 80 | 20 | 13.8 | 210 | 46 | " | 1.6 |

TABLE-continued

| Example | 1st stage polymer (weight part) | 2nd stage polymer (weight part) | Intrinsic viscosity (dl/g) | Tensile strength (kg/cm²) | Elongation at break in tension (%) | Izod impact strength (kg-cm/cm) | Abrasion wear (mg) |
| --- | --- | --- | --- | --- | --- | --- | --- |
| Example 6 Comparison Example 4 | 60* | 40* | 10.8 | 64 | 30 | " | 4.3 |

*Ratio of blending

What is claimed is:

1. An injection molding composition comprising an ultrahigh molecular weight polyethylene material having an intrinsic viscosity of 10-30 dl/g at 135° C. in decalin, said material resulting from a polymerization process consisting of the following two stages of polymerization reaction:

(a) a first reaction stage wherein an ethylene monomer is polymerized in a reaction vessel in the presence of a composite catalyst comprising a solid component containing at least magnesium, titanium and/or vanadium and an organometallic compound and in the absence of hydrogen or in the presence of hydrogen at a low concentration to produce 75-99 parts by weight of polyethylene having an intrinsic viscosity of 12-32 dl/g at 135° C. in decalin; and (b) a second reaction stage wherein a fresh feed of ethylene monomer is introduced in the same reaction vessel and polymerized in the presence of hydrogen at a higher concentration while retaining the reaction produce from the first reaction stage in said reaction vessel to produce 25-1 parts by weight of polyethylene having an intrinsic viscosity of 0.1-5 dl/g at 135° C. in decalin.

2. The composition according to claim 1 wherein the hydrogen concentration is 0-10 mol percent in the first reaction stage and 35-95 mol percent in the second direction stage.

* * * * *